United States Patent [19]

Tominaga et al.

[11] Patent Number: 4,567,219
[45] Date of Patent: Jan. 28, 1986

[54] COMPOSITION FOR COVER OF GOLF BALLS

[75] Inventors: Ichiro Tominaga, Kobe; Taketo Matsuki, Nishinomiya, both of Japan

[73] Assignee: Sumitomo Rubber Industries, Ltd., Kobe, Japan

[21] Appl. No.: 627,718

[22] Filed: Jul. 5, 1984

[30] Foreign Application Priority Data

Jul. 6, 1983 [JP] Japan ................................. 58-123899

[51] Int. Cl.4 ........................ A63B 37/12; C08L 33/02
[52] U.S. Cl. ................................ 524/413; 260/998.14; 273/235 R; 524/430; 524/432; 524/521; 524/908; 525/196; 525/201
[58] Field of Search ................................. 525/196, 201; 273/235 R; 260/998.14; 524/413, 432, 521, 522, 430, 908

[56] References Cited

U.S. PATENT DOCUMENTS

| 3,437,718 | 4/1969 | Rees | 525/196 |
|---|---|---|---|
| 3,819,768 | 6/1974 | Molitor | 525/201 |
| 3,940,146 | 2/1976 | Little | 260/998.14 |
| 4,169,599 | 10/1979 | Fujio et al. | 260/998.14 |
| 4,264,075 | 4/1981 | Miller et al. | 260/998.14 |
| 4,323,247 | 4/1982 | Keches et al. | 260/998.14 |
| 4,337,947 | 7/1982 | Saito et al. | 260/998.14 |
| 4,373,066 | 2/1983 | Karim et al. | 525/196 |
| 4,407,893 | 10/1983 | Malizio | 525/196 |
| 4,420,580 | 12/1983 | Herman et al. | 260/998.14 |

Primary Examiner—Allan M. Lieberman
Attorney, Agent, or Firm—Armstrong, Nikaido, Marmelstein & Kubovcik

[57] ABSTRACT

A cover composition for golf balls having an improved impact resistance which comprises an ionomer resin and 1 to 15 parts by weight of a linear low density polyethylene per 100 parts by weight of the ionomer resin.

5 Claims, 1 Drawing Figure

COMPOSITION FOR COVER OF GOLF BALLS

BACKGROUND OF THE INVENTION

The present invention relates to a composition suitable for a cover of golf balls, and more particularly to a cover composition having an excellent impact resistance.

In recent years, golf balls with a cover made of ionomer resins have spread and have been widely used, because of excellent cut resistance and flight characteristics. The ionomer resins sold under the trademark "Surlyn" by the E. I. duPont de Nemours Company are well known and widely employed as cover materials of golf balls. These resins are ionic copolymers of an olefin such as ethylene and a metal salt of an unsaturated carboxylic acid such as acrylic acid, methacrylic acid or maleic acid. The ionomer resins are also superior to general resins in impact resistance, but it has been desired to further improve the impact resistance of golf balls, since the balls are struck by a high impact force at a high speed.

It is a primary object of the present invention to provide a rubber composition suitable for a cover of golf balls and having an improved impact resistance.

The above and other objects of the present invention will become apparent from the description hereinafter.

SUMMARY OF THE INVENTION

It has now been found that the impact resistance can be further improved without lowering the physical properties of ionomer resins by using the ionomer resins in combination with a minor amount of a linear low density polyethylene.

In accordance with the present invention, there is provided a cover composition for golf balls comprising an ionomer resin and 1 to 15 parts by weight of a linear low density polyethylene per 100 parts by weight of said ionomer resin.

The crystallization of the ionomer resin is accelerated by using it in combination with the linear low density polyethylene within the above specified range, whereby the shrinkage percentage of a cover at the time of cooling after molding is increased. Consequentially, the dependency of the physical properties of the resin on thickness and the orientation of the resin are reduced, thus the impact resistance of the cover is increased. Also, the releasing property of a golf ball from a mold is improved. Further, since the linear low density polyethylene used in the invention has little long chain branches, the orientation in the both longitudinal and transverse directions is a little as compared with a usual low density polyethylene, and the tear strength at breaking, elongation and impact strength thereof are higher by 25 to 50% as compared with the most excellent usual low density polyethylene. Therefore, unlike usual polyethylene resins, excellent cut resistance and impact resilience that the ionomer resins possess are not lowered even if the linear low density polyethylene is used.

DETAILED DESCRIPTION

Figure 1:
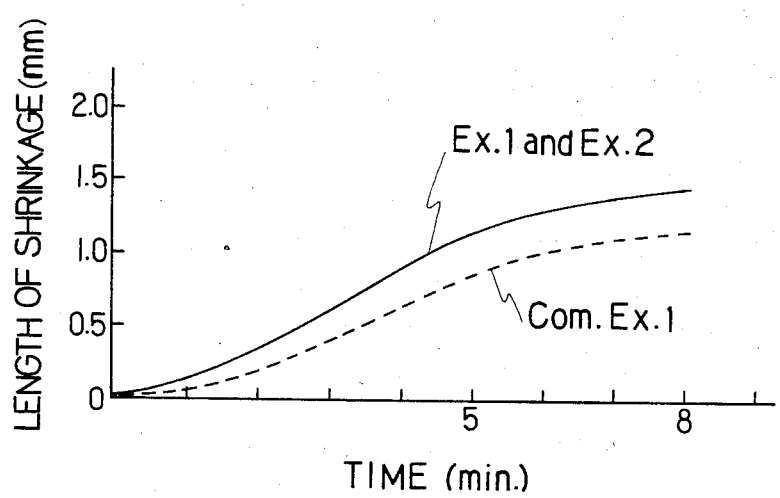
FIG. 1 is a graph showing the relationship between the length of shrinkage and time in cooling a cover composition heated at 150° C.

Known ionomer resins can be employed in the present invention. Examples of the ionomer resins are, for instance, an ionic copolymer consisting of units of an α-olefin such as ethylene or propylene, units of a monovalent or bivalent metal salt of an unsaturated monocarboxylic or dicarboxylic acid such as acrylic acid, methacryclic acid, maleic acid or fumaric acid, and units of the unsaturated monocarboxylic or dicarboxylic acid, and an ionic copolymer consisting of units of an α-olefin, units of a monovalent or bivalent metal salt of an unsaturated monocarboxylic or dicarboxylic acid, units of the unsaturated monocarboxylic or dicarboxylic acid, and units of a $C_1$ to $C_{10}$ alkyl ester of the unsaturated monocarboxylic or dicarboxylic acid. Ionic copolymers containing units of ethylene and units of a metal salt (e.g. Na, K, Zn, Mg or Ca salt) of acrylic or methacrylic acid are preferable. These copolymers are commercially available, e.g. ionomer resins sold by E. I. duPont de Nemours Co. under the trademark "Surlyn 1707", "Surlyn 1706", "Surlyn 1605" and "Surlyn 1601". The ionomer resins may be employed alone or in admixture of two or more kinds of the different grades thereof.

In the present invention, there is employed a linear low density polyethylene which has little long chain branches and shows a tear strength at breaking, an elongation and impact strength which are 25 to 50% higher than a general low density polyethylene. Preferable examples of commercially available such a linear low density polyethylene are, for instance, Dowlex 2552 (trademark of the product of Dow Chemical Co., melt index 25 g/10 minutes), Dowlex 2035 (trademark of the product of Dow Chemical Co., melt index 6.0 g/10 minutes), and SCLAIR 2109 (trademark of the product of E. I. duPont de Nemours Co., melt index 10.5 g/10 minutes). The linear low density polyethylene having a melt index of not less than 0.7 g/10 minutes are preferred, because of good moldability of the cover, particularly extrusion characteristic in injection molding. The linear low density polyethylene may be a mixture of two or more different grades of the resins.

The linear low density polyethylene is employed in an amount of 1 to 15 parts by weight, preferably 5 to 10 parts by weight, per 100 parts by weight of the ionomer resin. When the amount of the linear low density polyethylene is less than the above range, an effect of improving the impact resistance is not sufficiently improved, and when the amount is more than the above range, the cut resistance of the cover is lowered and the cover routinely becomes scratched by a golf club at the time of striking.

The cover composition of the present invention is prepared by adding the linear low density polyethylene to the ionomer resin, and if necessary, by further adding a small amount of an inorganic filler such as titanium dioxide or zinc oxide for the purpose of coloring or the like, and then uniformly mixing them. The cover composition may also contain usual other additives such as antioxidants and stabilizers.

The cover composition of the present invention is applicable to both of a wound core and a solid core. The covering of the core can be made in a usual manner. For instance, the cover composition is formed into a hemispherical shell. A pair of the shells are positioned around the core and subjected to a compression molding at an elevated temperature to fuse two shells together, e.g. at 140° to 170° C. for about 1 to 5 minutes. Alternatively, the cover composition is injection-molded directly around the core ball.

The present invention is more specifically described and explained by means of the following Examples in which all parts are by weight. It is to be understood that the present invention is not limited to the Examples, and various changes and modifications may by made in the invention without departing from the spirit and scope thereof.

EXAMPLES 1 AND 2 AND COMPARATIVE EXAMPLE 1

Cover compositions were prepared according to the formulations shown in Table 1.

TABLE 1

|  | Ex. 1 | Ex. 2 | Com. Ex. 3 |
|---|---|---|---|
| Surlyn 1605*[1] | 50 | 50 | 50 |
| Surlyn 1706*[1] | 50 | 50 | 50 |
| Dowlex 2035*[2] | 3.7 | 6 | — |
| Dowlex 2552*[3] | 3.7 | — | — |

*[1] Trademark of an ionomer resin made by E. I. duPont de Nemours Co.
*[2] Trademark of a linear low density polyethylene made by Dow Chemical Co. (melt index: 6.0 g/10 min.)
*[3] Trademark of a linear low density polyethylene made by Dow Chemical Co. (melt index: 25 g/10 min.)

The compositions were molded in a mold at 150° C. under pressure for 20 minutes to give slabs, and the physical properties and shrinkage percentage thereof were measured.

The physical properties were measured according to ASTM D 638. The shrinkage percentage was obtained by keeping the specimen at 150° C. for 20 minutes, allowing to stand at room temperature (25° C.) to cool and solidify the specimen, measuring the length of shrinkage 8 minutes after the initiation of the cooling and calculating the percentage of shrinkage based on the standard length 150 mm.

The results are shown in Table 2.

The speeds of shrinkage of the above compositions are also shown in FIG. 1. The compositions of Examples 1 and 2 showed approximately the same rate of shrinkage. Therefore, in FIG. 1, they are shown by a single curve.

TABLE 2

|  | Ex. 1 | Ex. 2 | Com. Ex. 1 |
|---|---|---|---|
| Thickness (mm) | 1.82 | 1.74 | 1.88 |
| Yield strength (kg/cm$^2$) 202 | 206 | 203 | |
| Modulus at 100% elongation (kg/cm$^2$) | 199 | 208 | 200 |
| Tensile strength (kg/cm$^2$) | 308 | 306 | 310 |
| Elongation (%) | 358 | 360 | 355 |
| Hardness (Shore D) | 71.0 | 71.1 | 71.3 |
| Tear strength (kg/cm) | 153 | 155 | 156 |
| Shrinkage percentage | 0.90 | 0.90 | 0.65 |

It is observed in Table 2 that the cover compositions of Examples 1 and 2 containing a linear low density polyethylene have a large shrinkage percentage as compared with the composition of Comparative Example 1 and also show no lowering of physical properties owing to incorporation of the linear low density polyethylene.

Next, the above-mentioned cover compositions were formed into hemispherical shells. A pair of the shells were positioned around a standard wound core ball having a diameter of about 39 mm, and molded in a mold at 150° C. under pressure for 2.5 minutes to give a wound golf ball having a diameter of 41.2 mm. The properties of the golf balls were measured as follows:

Coefficient of impact resilience was measured by propelling a ball out of a compressed air type resilience gun at a projectile speed of 45 m/sec.

Hammering impact resistance was measured by propelling a ball to a steel plate out of a compressed air type hammering tester at a speed of 45 m/sec, and counting the number of strikings until the first crack appeared.

Low temperature durability test was made by keeping a ball at −30° C. for at least 12 hours in a constant temperature freezer and allowing the ball to strike a steel plate at a speed of 45 m/sec. using the hammering tester. After striking 5 times in one cycle, the above cooling-striking procedure was repeated for 6 cycles total.

Cut resistance was observed by a cut resistance tester, a guillotine cut tester and a striking test with a No. 9 iron club by a man.

The results are shown in Table 3.

TABLE 3

|  | Ex. 1 | Ex. 2 | Com. Ex. 1 |
|---|---|---|---|
| Coefficient of impact resilience | 0.782 | 0.781 | 0.782 |
| Hammering impact resistance | 145 | 147 | 120 |
| Low temperature durability | good | good | good |
| Cut resistance | good | good | good |

As shown in Table 3, the cover composition of the present invention is superior in impact resistance to the composition of Comparative Example 1 which corresponds to a conventional cover composition. Moreover, lowering of other properties is not observed.

Further, the crystallization temperature and semi-crystallization time of the cover compositions were measured by employing a differential scanning calorimeter. The crystallization temperature shows a temperature at which the composition completely molten at 150° C. begins to crystallize when cooled at room temperature (25° C.). The semi-crystallization time shows a time until reaching half the whole quantity of heat in crystallization obtained from the peak curve of the quantity of heat.

The results are shown in Table 4.

TABLE 4

|  | Ex. 1 | Ex. 2 | Com. Ex. 1 |
|---|---|---|---|
| Crystallization temperature (°C.) | 50.0 | 49.5 | 45.0 |
| Semi-crystallization time | 2'25" | 2'28" | 3'09" |

It is observed in Table 4 that the composition of the present invention has a high crystallization temperature and also the semi-crystallization time is short. It is considered that these characteristics increase the shrinkage percentage, thus the impact resistance is improved.

EXAMPLE 3 AND COMPARATIVE EXAMPLE 2

Cover compositions were prepared according to the formulations shown in Table 5.

TABLE 5

|  | Ex. 3 | Com. Ex. 2 |
|---|---|---|
| Surlyn 1605 | 50 | 50 |

TABLE 5-continued

|  | Ex. 3 | Com. Ex. 2 |
| --- | --- | --- |
| Surlyn 1706 | 50 | 50 |
| SCLAIR 2109*1 | 6.0 | — |

*1Trademark of a linear low density polyethylene made by E. I. duPont de Nemours Co., Canada (melt index: 10.5 g/10 min.)

A solid core having a diameter of 38.0 mm and being mainly composed of a polybutadiene rubber was covered with each of the cover compositions by injection molding to give a small-sized two piece golf ball having a diameter of 41.2 mm. The properties of the obtained golf balls were measured.

The results are shown in Table 6.

TABLE 6

|  | Ex. 3 | Com. Ex. 2 |
| --- | --- | --- |
| Weight of ball (g) | 45.0 | 45.1 |
| Coefficient of impact resilience | 0.752 | 0.753 |
| Hammering impact resistance | 280 | 215 |
| Low temperature durability | good | good |
| Cut resistance | good | good |

It is observed in Table 6 that the two piece solid golf ball prepared from the cover composition of the present invention has a very excellent impact resistance as compared with the ball prepared from a conventional cover composition of Comparative Example 2.

In addition to the ingredients used in the Examples, other ingredients can be used in the Examples as set forth in the specification to obtain substantially the same results.

What we claim is:

1. A cover composition for golf balls consisting essentially of an ionomer resin which is an ionic copolymer comprising units of an α-olefin and units of a monovalent or bivalent metal salt of an unsaturated monocarboxylic or dicarboxylic acid and 1 to 15 parts by weight of a linear low density polyethylene per 100 parts by weight of said ionomer resin.

2. The composition of claim 1, wherein said linear low density polyethylene has a melt index of not less than 0.7 g/10 min.

3. The composition of claim 1, wherein the amount of said linear low density polyethylene is from 5 to 10 parts by weight per 100 parts by weight of said ionomer resin.

4. The cover composition according to claim 1, which further contains one or more additives selected from the group consisting of inorganic fillers, antioxidants and stabilizers.

5. The cover composition according to claim 4, wherein said inorganic filler is a member selected from the group consisting of titanium dioxide and zinc oxide.

* * * * *